United States Patent [19]

Chillier-Duchatel et al.

[11] 4,048,384
[45] Sept. 13, 1977

[54] CONTROL SYSTEM AND APPARATUS FOR REDOX TYPE ELECTROCHEMICAL CELL

[75] Inventors: Nicole Chillier-Duchatel, Sevres; Bernard Verger, Chevreuse, both of France

[73] Assignee: Societe Generale de Constructions Electriques et Mecaniques "Alsthom et Cie", Paris, France

[21] Appl. No.: 676,988

[22] Filed: Apr. 14, 1976

[30] Foreign Application Priority Data

Apr. 24, 1975 France .................................. 75.12850

[51] Int. Cl.² .................. H01M 8/18; H01M 8/04
[52] U.S. Cl. ..................................................... 429/22
[58] Field of Search ................. 429/15, 17, 19, 22, 429/23

[56] References Cited

U.S. PATENT DOCUMENTS 3,540,934  11/1970  Boeke ..................................... 429/19
3,849,201  11/1974  Kordesch ............................... 429/23

Primary Examiner—John H. Mack
Assistant Examiner—H. A. Feeley
Attorney, Agent, or Firm—Flynn & Frishauf

[57] ABSTRACT

The invention concerns the regulation of an electrochemical system of the Redox type. It consists in immersing three electrodes in a stream to or from a cell in the said Redox system. Two of the electrodes, referred to as measuring electrodes, are connected by two resistors defining a junction point therebetween. A direct current is applied across these electrodes. The potential of the other electrode, called the reference electrode, is compared with the potential of said junction point. The ratio between the resistors is determined so that the potentials of the said junction point and of the said reference electrode is equal, this being so for a determined power supplied by the said electrochemical system. Variation of the potential are used to regulate the flow of fuel and/or of oxidizing agent to the said electrochemical system. The invention is more particularly implemented in fuel cells using the Redox system containing anthraquinone 2-7 sodium disulphonate. The invention also includes the cells, preferably fuel cells, embodying the aforesaid apparatus.

14 Claims, 5 Drawing Figures

CONTROL SYSTEM AND APPARATUS FOR REDOX TYPE ELECTROCHEMICAL CELL

The object of the present invention is a method for regulating an electrochemical system of the Redox type.

It also concerns a device for implementing the said method.

Electrochemical systems of the Redox type such as fuel cells, storage batteries and electrolysers are well-known. To give a clear idea, in a fuel cell of the Redox type, the cathode compartment is fed mainly with an oxidized form of a Redox system, whereas the anode compartment is fed mainly with a reduced form. The reduced and oxidized forms thus produced in the battery are regenerated by a fuel and a combustive (oxidizing agent) respectively. The electric power supplied by such batteries is, of course, a function of the rates of transformation from one of the forms into the other and of the rates of fuel and combustive feeding such electrochemical cells.

Consequently, if it is required to regulate the electric power supplied, it is therefore necessary to provide for the said rates to be subjected to the control of the said electric power.

In actual fact, the relationship between such parameters is relatively complex and varies in time and as a function of the power supplied.

The result of this is that the use of conventional systems does not make it possible to ensure strict and reliable control.

The present invention is intended to overcome such disadvantages and it has as its object a simple method and a simple device suitable for effecting a strict regulating of electrochemical systems and more particularly of fuel cells of the Redox type which have, moreover, high reliability and a moderate cost price.

The invention therefore has as its object a method of regulating the power supplied or consumed by an electrochemical system of the Redox type and more particularly of a fuel cell comprising an enclosure divided by a membrane into an anode compartment and into a cathode compartment, the said anode compartment being fed by means of a first pipe with an aqueous solution of a Redox system comprising, mostly, the reduced form of the said system, the said aqueous solution leaving the said anode compartment through a second pipe being conveyed towards a first reactor fed with a first combustible reagent suitable for regenerating the said reduced form by reduction of the oxidized form produced in the said anode compartment, the said cathode compartment being fed by at least a third pipe with an aqueous solution of the said Redox system comprising, mostly, the oxidized form of the said system, the said aqueous solution leaving the said cathode compartment through a fourth pipe being conveyed towards a second reactor fed with a second combustive reagent suitable for regenerating the said oxidized form by oxidation of the reduced form produced in the said cathode compartment, that method being characterized in that in at least one of the aqueous solutions of the said Redox system feeding or leaving at least the anode compartment, three electrodes are immersed, two resistors connected up in series are arranged at the terminals of two of the electrodes, called measuring electrodes, a difference in potential is applied to the terminals of the said measuring electrode, the ratio of the value of the said resistors is adjusted so that the potential of their junction point be equal to the potential (or balance potential of the Redox system) of the third electrode, called the reference electrode, this being so at a predetermined value of the power supplied by the said battery, any contingent variation in the potential of the said reference electrode is used to control, by means of the resulting voltage, the discharge rate of at least one of the said two reagents so that the said power supplied by the battery has a constant value.

The invention also has as its object a device for implementing the said method, characterized in that it comprises three electrodes, two of which are called measuring electrodes and one of which is called a reference electrode, fitted in a fluid-tight manner in the inside bore of a screw socket by means of a sheath, it being possible to screw the said socket into one of the said pipes so that one of the ends of the said electrodes be immersed in the aqueous solutiion of the Redox system flowing in the pipe, two resistors having a variable ratio connected together in series and arranged at the terminals of the said measuring electrodes, a direct current generator arranged also at the terminals of the measuring electrodes, means being provided for subjecting the discharge rate of a least one of the two reagents to the control of the signal detected between the junction point of the said resistors and the said reference electrode.

Other characteristics and advantages of the invention will become apparent from the following description, given by way of a purely illustrating example having no limiting character, with reference to the accompanying drawings and diagrams, in which.

Figure 1:
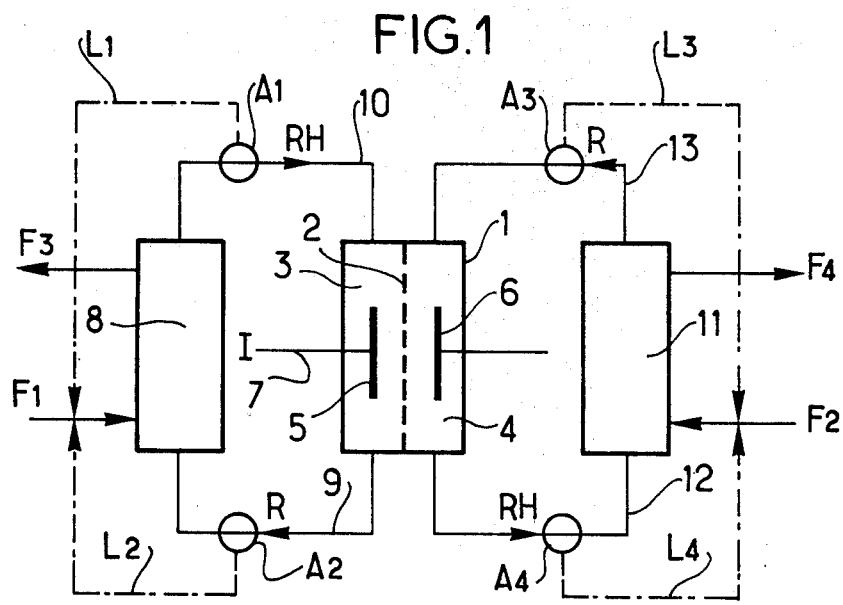
FIG. 1 shows very diagrammatically a fuel cell of the Redox type fitted with the regulating devices according to the invention.

According to FIG. 1, a fuel cell of the Redox type comprises an enclosure 1 inside which a membrane 2 defines an anode compartment 3 and a cathode compartment 4. The anode compartment 3 comprises the anode 5 and the cathode compartment 4 comprises the cathode 6, the current I supplied by the battery being collected at the output terminals 7.

Furthermore, a first reagent 8 fed with a fuel in the direction of the arrow F1 is suitable for reducing the oxidized form R of the Redox system leaving the anode compartment 3 through the pipe 9 and for conveying the reduced form RH thus obtained towards the said anode compartment 3 through the pipe 10.

Likewise, a second reagent 11 fed with a combustive in the direction of the arrow F2 is suitable for oxidizing the reduced form RH of the said Redox system leaving the cathode compartment 4 through the pipe 12 and for conveying the oxidized form R thus obtained towards the said cathode compartment 4 through the pipe 13.

The arrows F3 and F4 illustrate materially the evacuating of the exhausted reagents and also of the products resulting from the electrochemical process towards the outside, this being so with the reactors 8 and 11 respectively.

Lastly, the references A1, A2, A3, A4 illustrate materially, in the most general case, regulating devices according to the invention which are suitable for controlling the injecting of the reagents by regulating the feed rates of the fuel and of the combustive in the direction of the arrows F1 and F2 respectively, such regulating being materially illustrated by the lines L1, L2, L3, L4 respectively, by way of an example having no limiting character, the Redox system such as the system containing anthraquinone 2-7 sodium disulphonate can be implemented in such a battery. Of course, another system can be used.

Figure 2:
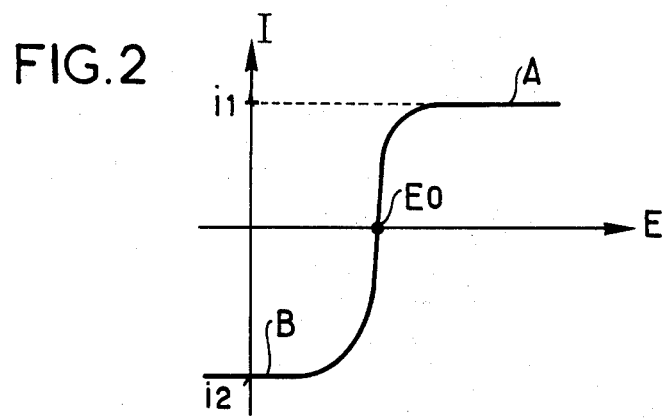
FIG. 2 shows the oxidation curve of a Redox system implementing in such a battery.

FIG. 2 shows the oxide reduction curve or polarization curve of a Redox system which can be implemented in the previously described battery.

As is known, such a curve is established by immersing an electrode in an aqueous solution of a Redox system whose potential E is made to vary in relation to a relation to a reference electrode such as a calomel electrode. Thus, the intensity I is measured as a function of the said potential E and the polarization curve E (I) of the Redox system concerned is obtained.

It should therefore be stated for reference that the part A of the curve characterizes the reducer or "Red" phase, whereas the part B concerns the oxidizing or "Ox" phase.

Such a curve is characteristic of the Redox anthraquinone system containing 2-7 sodium disulphonate or of the system containing $Fe^{2+}$ $Fe^{3+}$ $+ e -$ or of any other system of the type called "rapid", that is, of a system in which the balance between the electrode and the solution is established at very high speed.

It will be observed that in such a curve, the intensities $i1$ and $i2$ corresponding to the plateaux of the portions A and B of the curve are proportional to the concentrations of the phases "Red" and "Ox" respectively.

Moreover, the point Fo at which $i = 0$ is the balance potential of the system defined by Nernst's law.

It corresponds to the equality of the concentrations of the "Red" form and of the "Ox" form.

Figure 3:
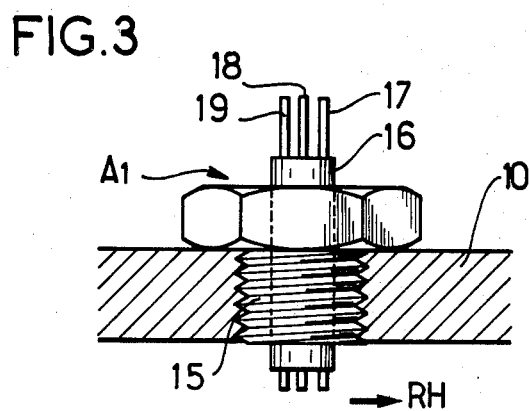
FIG. 3 shows a front view of a regulating device according to the invention.

FIG. 3 shows a front view of a device such as A1, A2, A3 or A4 (FIG. 1).

For example, the device A1 arranged in the wall of the pipe 10 (FIG. 1) inside which the reduced form RH flows, comprises a screw socket 15 screwed into the said wall. The inside bore of that socket comprises a sheath 16 ensuring the fluid-tight passing of 3 metallic electrodes 17, 18, 19 one of whose ends is thus immersed in the solution conveyed in the pipe 10. Those electrodes must enable a rapid balance between the metal and the solution.

Figure 4:
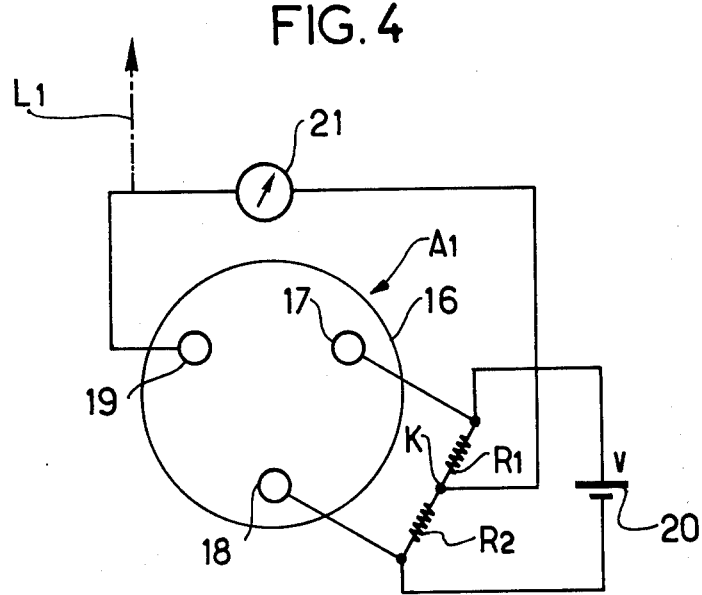
FIG. 4 shows a top view of the said regulating device according to the invention, as well as the electric syctem connected therewith.

FIG. 4 shows a top view of the arrangement of the said electrodes and of the electric system connected therewith.

The electrodes 17 and 18, called measuring electrodes, have identical dimensions and are made of an electrochemically active material such as silver or silver-coated stainless steel; they are connected to the terminals of a direct current generator 20 suitable for providing a difference in potential $v$. Moreover, two resistors R1 and R2 arranged in series are connected to the terminals of the said electrodes 17 and 18. The potential of the electrode 19, called the reference electrode, which can be either identical to the previous electrodes or different from them, from the point of view of both dimensions and component metal, can be compared with the potential of the point K situated at the junction of the resistors R1 and R2 by means of a millivoltmeter 21. The resulting signal is addressed to the fuel injection device F1 to regulate the feed rate of the latter as materially shown by the line L1 (FIG. 1) for example, by means of an electrovalve.

Figure 5:
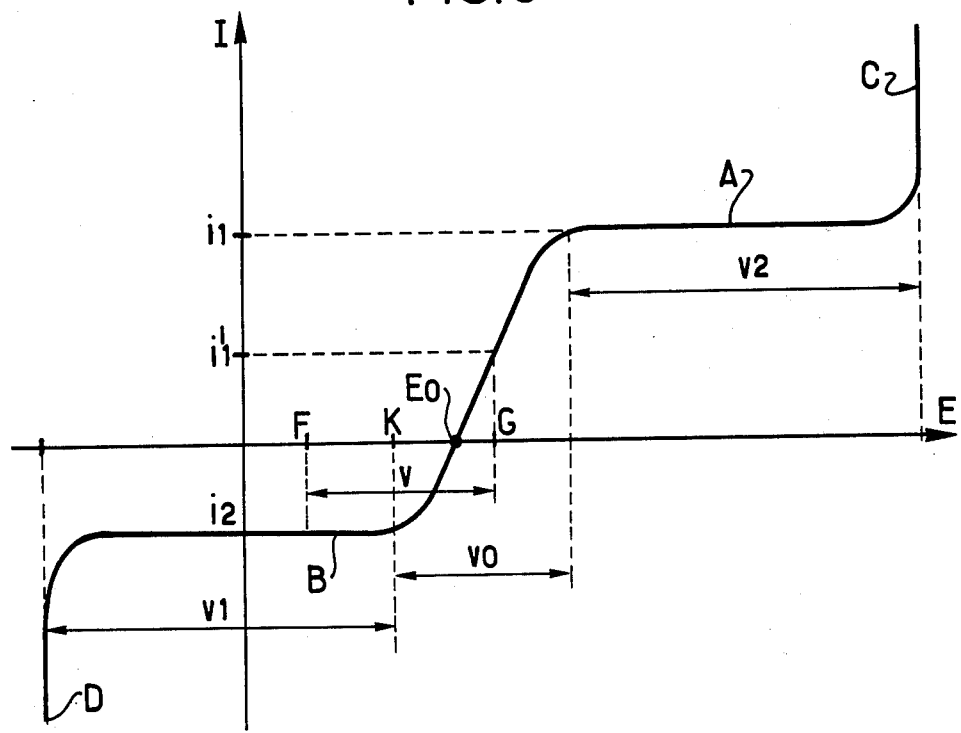
FIG. 5 illustrates the method according to the invention.

FIG. 5 makes it possible to explain clearly the method according to the invention.

That figure shows again the polarization curve E (I) of the Redox system flowing in the pipe 10 and thus being very concentrated in the form Red RH, that curve being analogous to that previously shown with reference to FIG. 2, but the vertical parts C and D corresponding respectively to the evolving of oxygen and of hydrogen from the water in the solution have also been illustrated.

The difference in potential corresponding to the thresholds of the plateaux of the portions A and B of the curve are designated as $v0$.

The difference inpotential $v$ applied to the terminals of the measuring electrodes 17 and 18, as well as to the terminals of the resistors R1 and R2 (FIG. 4) is chosen so as to be greater than $v0$, while being less that the differences in potential $v1$ and $v2$ corresponding respectively to the evolving of hydrogen and of oxygen resulting from the electrolysis of the water in the solution.

That voltage $v$ represented by the segment FG is established so that the intensities of oxygen reducing $i'1$ and $i'2$ be equal in absolute value.

Furthermore, $Eo$ represents the potential of the reference electrode 19 (FIG. 4). The point K of the segment FG represents the potential of the junction K between the resistors R1 and R2 (FIG. 4) and, of course, the equation obtained is:

$$KG/KF = R1/R2$$

The segment EoK therefore represents the difference in potential between the point K and the reference electrode 19, measured by the millivoltmeter 21 and representing the signal addressed to the fuel injection device F1 as shown at L1. It will therefore be seen that by adjusting the ratio R1/R2, it is possible to bring the point K into coincidence with the point Eo, in other words, to obtain a zero voltage between the point K and the reference electrode 19.

If it is now assumed that for a predetermined power or intensity I, supplied by the battery, there are concentrations RH and R of the Redox system, such as shown in FIG. 4 and that the ratio R1/R2 has previously been adjusted so that the signal detected by the milliamperemeter 21 be zero, it will be seen that for any variation in respective concentrations of RH and of R, the point Eo will move either to the left or to the right of the point K subsequent to the variation in the potential of the reference electrode 19. The result of this is that a signal appears between the electrode 19 and the point K, that signal being addressed by the regulating device L1 to the discharge rate of the fuel F1, which will be either increased or decreased, as the case may be, so as to bring the concentration having the form RH to its predetermined value corresponding to the diagram in FIG. 5.

The operation of the device A1 has been described herein-above.

Of course, the devices A2, A3, A4 operate in an identical way. Thus, the device A2 arranged on the pipe 9 could also regulate the injection of fuel F1 as shown at L2 as a function of the concentration having the form R in the said pipe.

Likewise, the devices A3 and A4 could regulate the injection of combustive F2 as shown at L3 and L4 by a similar process.

It should however be observed that it is possible to use only one regulating device on each loop.

Thus, it would be possible to use only the device A1 on the anode loop and the device A3 on the cathode loop, or else the device A2 and the device A4.

Nevertheless, the use of two devices per loop makes it possible to ensure very precise regulating.

It should also be observed that in the case where the combustive used is air, regulating could be effected exclusively on the anode loop, that is, that only the device A1, or the device A2, or else those two devices jointly, are used.

A fuel cell of the Redox type, regulated by means of the method and of the device according to the invention has also been described hereinabove by way of an example having no limiting character.

It is of course, possible to regulate similarly a battery of the Redox type and also, an electrolyser, without going beyond the intent of the invention and, generally, to regulate any electrochemical system of the Redox type.

The method and the device according to the invention therefore make it possible to regulate a Redox electrochemical system in a strict and reliable manner, whatever the agitation of the medium, the temperature, the ageing of the electrodes and the total concentration of the Redox system, more particularly, may be. Such a system has, moreover, a simple structure and it can be mass-produced at a moderate cost price.

It must be understood that the invention is in no way limited to the embodiment described and illustrated, which has been given only by way of an example. More particularly, without going beyond the scope of the invention, details can be modified, certain arrangements can be changed or certain means can be replaced by equivalent means.

What is claimed is:

1. In an electrochemical cell apparatus of the Redox type having an anode compartment and a cathode compartment separated by a membrane, a first conduit for feeding a reduced form of a first aqueous solution to said anode compartment, a second conduit for conveying an oxidized form of said first aqueous solution from said anode compartment, a first reactor coupled to said first and second conduits and being fed with a combustible reagent for regenerating said reduced form of said first aqueous solution, a third conduit for feeding an oxidized form of a second aqueous solution to said cathode compartment, a fourth conduit for conveying a reduced form of said second aqueous solution from said cathode compartment, and a second reactor coupled to said third and fourth conduits and being fed with an oxidizing reagent for regenerating the said oxidized form of said second aqueous solution, the improvement comprising first and second measuring electrodes and a third reference electrode, means coupling said three electrodes to at least one of said conduits such that at least an end of each of said electrodes is immersed in the aqueous solution flowing in said at least one conduit, said electrodes being electrically insulated from each other, two resistors connected together in series between said measuring electrodes and defining a junction point therebetween, a direct current generator coupled to said measuring electrodes for applying a dc voltage across said resistors, and means coupled between said reference electrode and said junction point of said two series connected resistors for detecting differences between the signals at said junction point and said reference electrode, and means responsive to said differences in signals for controlling the flow of at least one of said reagents.

2. Apparatus according to claim 1 comprising a sheath in which said first, second and third electrodes are mounted in a fluid-tight manner, and means for mounting said sheath in said conduits in a fluid-tight manner; and said electrochemical cell being a fuel cell.

3. Apparatus according to claim 2 wherein said conduit has a screw-threaded bore and wherein said sheath has screw threads thereon for engagement with the screw threads of said bore.

4. Apparatus according to claim 1 wherein said two resistors have a variable ratio of resistance values.

5. Apparatus according to claim 1 wherein said dc voltage is greater than the difference in potential corresponding to the thresholds of the plateau of intensity of the oxidizing form and plateau of intensity of the reduced form determined on the polarization curve of said Redox system and is less than the potential at which hydrogen is evolved and at which oxygen is evolved in said system.

6. Apparatus according to claim 5 wherein said two measuring electrodes are identical and comprise an electrochemically active metal which forms an electrochemical system with said aqueous solution in which it is immersed which rapidly attains equilibrium.

7. Apparatus according to claim 6 wherein the surface of said measuring electrodes comprises silver.

8. Method for regulating an electrochemical cell of the Redox type conprising feeding a reduced form of a first aqueous solution to the anode compartment of said cell and conducting an oxidized form of said first aqueous solution from said anode compartment to a first reactor wherein it is admixed with combustible reagent for regenerating said reduced form of said first aqueous solution; and feeding an oxidized form of a second aqueous solution to the cathode compartment of said cell and conveying a reduced form of said aqueous solution from said cathode compartment to a second reactor wherein it is oxidized by admixture with an oxidizing reagent for regenerating the said oxidized form of said second aqueous solution; and immersing a first and second measuring electrode and a third reference electrode in at least one of said aqueous solutions, said electrodes being electrically insulated from each other with two resistors connected together in series between said two measuring electrodes and defining a junction point therebetween, and applying a dc voltage to said measuring electrodes across said resistors, and measuring the difference between the voltage of said reference electrodes and the voltage at said junction point; and regulating the feed of at least one of said reagents responsive to differences between the voltage at said reference electrode and said junction point.

9. The method of claim 8 wherein the difference in voltage applied across the ends of said measuring electrodes is a value greater than the difference in potential corresponding to the thresholds of the plateau of the intensity of the oxidizing form of said Redox system and of the plateau of intensity of the reduced form of said Redox system, determined on the polarization curve of said Redox system and is a value less than the potential at which hydrogen is evolved and at which oxygen is evolved in said Redox system.

10. The method of claim 9 wherein said Redox system is the oxide-reducing system containing anthraquinone 2-7 sodium disulphonate.

11. The method of claim 8 wherein said Redox system is the oxide-reducing system containing anthraquinone 2-7 sodium disulphonate.

12. The method of claim 8 wherein the resistance of said resistors is adjusted so that the voltage at said junction point is equal to the voltage of the reference electrode under said applied dc voltage, and any variation from said potential of the reference electrode is used to control the feed rate of at least one of said reagents.

13. The method according to claim 8 wherein said oxidizing reagent is air.

14. The method according to claim 8 wherein the feed rate of at least one of said reagents is controlled so that the power supplied by said electrochemical cell has a constant value.

* * * * *